(12) United States Patent
Engel et al.

(10) Patent No.: US 6,876,532 B2
(45) Date of Patent: Apr. 5, 2005

(54) CIRCUIT INTERRUPTER TRIP UNIT

(75) Inventors: Joseph C. Engel, Monroeville, PA (US); Kevin L. Parker, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 271 days.

(21) Appl. No.: 10/134,411

(22) Filed: Apr. 29, 2002

(65) Prior Publication Data
US 2003/0202305 A1 Oct. 30, 2003

(51) Int. Cl.$^7$ ................................................. H02H 5/04
(52) U.S. Cl. ..................................... 361/93.8; 361/103
(58) Field of Search ............................... 361/93.8, 103, 361/106, 93.1, 99, 115, 42

(56) References Cited

U.S. PATENT DOCUMENTS

| | | | |
|---|---|---|---|
| 3,991,391 A | 11/1976 | Wafer | |
| 4,358,810 A | 11/1982 | Wafer et al. | |
| 5,835,320 A | * 11/1998 | Palmieri et al. | ............ 361/106 |
| 6,137,386 A | 10/2000 | Mueller | |

* cited by examiner

*Primary Examiner*—Brian Sircus
*Assistant Examiner*—James A Demakis
(74) *Attorney, Agent, or Firm*—Martin J. Moran

(57) ABSTRACT

A trip unit for a circuit interrupter includes a power supply, a plurality of input terminals and a plurality of output terminals. A heater conductor is electrically connected between each pair of the input and output terminals. The heater conductor is adapted to generate heat responsive to current flowing through the conductor. A diode is disposed proximate each of the conductors for heating thereby. The diodes are electrically interconnected with the power supply and are adapted to provide a forward voltage representative of the temperature of the corresponding conductor. Another diode is electrically interconnected with the power supply and is adapted to provide a forward voltage representative of ambient temperature. A thermal trip circuit generates a trip signal for the circuit interrupter responsive to the forward voltage of the diodes.

7 Claims, 10 Drawing Sheets

CIRCUIT INTERRUPTER TRIP UNIT

BACKGROUND OF THE INVENTION

1. Field of the Invention

This invention relates to circuit interrupters and, more particularly, to circuit breakers, which provide thermal and/or overcurrent or instantaneous protection for a load, and more particularly, to molded case circuit breakers, which include a trip unit. The invention also relates to trip units for circuit interrupters, such as circuit breakers.

2. Background Information

In small circuit breakers, commonly referred to as miniature circuit breakers, used for residential and light industrial applications, overcurrent protection is typically provided by a thermal-magnetic trip device. This trip device typically includes a bimetal strip that is heated and bends in response to a persistent overload condition. The bimetal, in turn, unlatches a spring powered operating mechanism that opens the separable contacts of the circuit breaker to interrupt current flow in the protected power system.

For short circuit protection, an armature, which is attracted by sizable magnetic forces generated in a magnetic core by a short circuit, unlatches, or trips, a circuit breaker operating mechanism. As an example, the magnetic type actuation occurs when the hot line conductor becomes directly connected with ground or neutral, thereby bypassing the load.

Many circuit breakers employ integral trip units to automatically open the breaker, thereby de-energizing the associated circuit whenever an overcurrent or overload condition exists. Typically, such trip units are electro-magnetic-based. The trip units provide independent protection for each circuit breaker phase through a common trip mechanism, in order that all breaker poles are opened should one pole or phase encounter an overload or overcurrent.

In a conventional thermal-magnetic trip unit, a resistive portion of a phase conductor is used to directly heat the corresponding bimetal. The heated bimetal of the trip unit deflects as the result of $i^2R$ heating, wherein i is the circuit breaker's load current and R is the value of resistance of the bimetal heater. The bimetal overcurrent protection is nearly ideal, since the purpose of the trip unit is to protect wire insulation on the protected power circuit conductor from an over-temperature condition caused by the $i^2R$ heating of the wire. The bimetal temperature determines its deflection. In turn, at a particular bimetal temperature or deflection, the spring powered operating mechanism is released, in order to trip open the circuit breaker. The bimetal temperature tracks the protected wire's insulation temperature. This, therefore, tends to limit the maximum temperature of that insulation.

The mass of the heater for the bimetal is designed to give a thermal heating response time that again matches that of the protected wire. For relatively large currents, the response time is inversely proportional to the square of the current. The energy absorbed by this heater and, thus, its temperature rise, assuming time is too short for cooling to occur, is simply power integrated over time. For a fixed current and resistance, the temperature rise is proportional to $i^2RT$, wherein T is the time duration of the flow of the current i. The time for a fixed heater/bimetal temperature rise ($\Delta t$) as a function of i is, therefore, given by $\Delta t/i^2$=constant. In other words, for a particular value of current, the time for the temperature to rise to a particular value is also constant.

Once the bimetal has been heated to the circuit breaker's trip value, the breaker trips and, thus, the load current through the bimetal heater is interrupted. In turn, the bimetal begins to cool just as the wire of the protected power circuit cools. This "memory" effect is important. If the circuit breaker is re-closed shortly after it has tripped, then it is important that any subsequent trip occur relatively sooner, in order to again limit the wire insulation temperature to a fixed value.

The circuit breaker trip unit also provides overcurrent or instantaneous protection. The phase current is passed through a magnetic circuit consisting of a moveable magnetic element and a series air gap. The overcurrent produces a flux in this path, which passes through the air gap and the moveable magnetic member, thereby producing a magnetic force in an effort to shorten the air gap by moving the moveable member. The design is such that if the moveable member moves, then it also unlatches the spring powered operating mechanism, thereby tripping open the circuit breaker.

The simple and apparently inexpensive thermal-magnetic trip unit has a number of problems. First, it is difficult to calibrate, since actual currents are required. The bimetal must actually bend in order that its travel can be adjusted to allow the operating mechanism to trip open the circuit breaker at the appropriate current level. If the bimetal adjustment is wrong, then the bimetal must be cooled in order that the calibration can again be verified and adjusted if necessary. This process can be repetitive and time-consuming.

A second problem involves the lack of adjustment or compensation for ambient temperature change. A circuit breaker, which is exposed to an outdoor environment, such as direct sun light, tends to trip at a lower value of current than it would if it were located in a cooler environment. While it is possible to provide an ambient compensated bimetal through the use of a second bimetal, such designs are relatively expensive and are typically not employed in molded case circuit breaker applications.

Finally, it is desirable to allow a limited adjustment of the thermal or overload trip level. For example, if a power circuit is wired for 600 amperes, then a 500-ampere trip unit best protects the connected load. Hence, it is desirable to be able to lower the trip unit's rated current value by, for example, 50% through a simple external adjustment.

There is room for improvement in circuit interrupters and circuit breaker trip units.

SUMMARY OF THE INVENTION

These needs and others are met by the present invention, which is directed to a trip unit for a circuit interrupter, such as a circuit breaker. A thermal trip circuit employs means for providing an electrical signal representative of the temperature of a current carrying conductor, and generates a trip signal for the circuit interrupter responsive to the electrical signal. A current transformer is mounted about one of the legs of the conductor, such as a U-shaped conductor. The current transformer outputs a signal representative of the current flowing through the U-shaped conductor. An instantaneous trip circuit is adapted to generate another trip signal for the circuit interrupter responsive to the signal representative of the current flowing through the U-shaped conductor.

A power supply for the trip unit has a first output with a signal representative of the current flowing through the conductor, and has a second output with a voltage. The instantaneous trip circuit is electrically interconnected with and powered from the voltage of the power supply, and is adapted to generate a trip signal for the circuit interrupter responsive to the signal representative of the conductor current. Preferably, the power supply employs a switching regulator, which provides an output having a voltage being the signal representative of the conductor current.

As one aspect of the invention, a trip unit for a circuit interrupter comprises: a power supply; at least one first terminal; at least one second terminal; for each pair of the first and second terminals, a conductor electrically connected between the pair of the first and second terminals, the conductor adapted to generate heat responsive to current flowing through the conductor, the conductor having a temperature; for each conductor, means for providing an electrical signal representative of the temperature of the conductor; and means for generating a trip signal for the circuit interrupter responsive to the electrical signal. The means for providing an electrical signal may include a diode mounted on a printed circuit board having a thermal pad proximate the diode, with the printed circuit board being secured to the conductor, and the thermal pad engaging the conductor.

The means for providing an electrical signal may be a diode having a voltage representative of the temperature of the conductor. The means for generating may include means for providing a first reference voltage, means for generating a difference between the first reference voltage and the voltage of the diode, and means for generating the trip signal for the circuit interrupter when the difference is greater than a second reference voltage. The means for generating may further include a second diode adapted to sense ambient temperature, with the second diode electrically interconnected with the power supply and adapted to output the first reference voltage, in order that the trip signal is generated based upon a difference between the temperature of the conductor and the ambient temperature. The means for generating may further include means for adjusting the second reference voltage.

As another aspect of the invention, a trip unit for a circuit interrupter comprises: a first terminal; a second terminal; a conductor electrically connected between the first and second terminals; a current transformer mounted about the conductor, the current transformer having an output with a first signal representative of current flowing through the conductor; a power supply having an input electrically interconnected with the output of the current transformer, the power supply having a first output with a second signal representative of the current flowing through the conductor, the power supply having a second output with a voltage; and a trip circuit electrically interconnected with the first and second outputs of the power supply, the trip circuit powered from the voltage of the power supply, the trip circuit adapted to generate a trip signal for the circuit interrupter responsive to the second signal representative of the current flowing through the conductor.

The conductor may be adapted to generate heat responsive to the current flowing through the conductor. The trip circuit may comprise an instantaneous trip circuit adapted to generate a first trip signal responsive to the second signal representative of the current flowing through the conductor, a thermal trip circuit adapted to sense a temperature of the conductor and generate a second trip signal, and a circuit responsive to the first trip signal of the instantaneous trip circuit and the second trip signal of the thermal trip circuit for generating a third trip signal as the trip signal for the circuit interrupter.

The power supply may comprise a full wave bridge having a first input electrically interconnected with a first node of the current transformer, a second input electrically interconnected with a second node of the current transformer, a first output, and a second output electrically interconnected with a second node of the power supply, a diode electrically connected between the first output of the full wave bridge and a first node of the power supply, a transistor having an input, a first output and a second output, a resistor electrically interconnected between the first and second outputs of the full wave bridge by the first and second outputs of the transistor, and a switching regulator electrically connected between the first and second nodes of the power supply, the switching regulator having an output electrically interconnected with the input of the transistor, in order that the resistor has a voltage thereacross, which voltage is the second signal representative of the current flowing through the conductor. Preferably, the switching regulator is adapted to switch the transistor on and off with a duty cycle of about 90%, in order that the voltage across the resistor substantially represents the second signal representative of the current flowing through the conductor.

The trip circuit may comprise an instantaneous trip circuit comprising an amplifier having an input, which is electrically interconnected with the first output of the power supply, and an output; a reference voltage; a comparator having a first input electrically interconnected with the reference voltage, a second input electrically interconnected with the output of the amplifier, and an output; and a circuit generating the trip signal responsive to the output of the comparator. Preferably, the instantaneous trip circuit further comprises means for adjusting the reference voltage, in order to provide an instantaneous trip adjustment.

As another aspect of the invention, a trip unit for a circuit interrupter comprises: a first terminal; a second terminal; a conductor having a first leg and a second leg, the first leg electrically interconnected with the first terminal and the second leg electrically interconnected with the second terminal; a current transformer mounted on one of the legs of the conductor, the current transformer outputting a signal representative of current flowing through the conductor; and a trip circuit adapted to generate a trip signal for the circuit interrupter responsive to the signal representative of the current flowing through the conductor.

The conductor may be adapted to generate heat responsive to the current flowing therethrough. The trip circuit may comprise an instantaneous trip circuit adapted to generate a first trip signal responsive to the signal representative of the current flowing through the conductor; a thermal trip circuit sensing a temperature of the conductor and generating a second trip signal; and a circuit responsive to the first trip signal of the instantaneous trip circuit and the second trip signal of the thermal trip circuit for providing a third trip signal to the circuit interrupter.

As another aspect of the invention, a circuit breaker comprises: separable contacts; an operating mechanism for opening and closing the separable contacts, the operating mechanism including a latch for tripping open the separable contacts; means for responding to a trip signal and activating the latch of the operating mechanism; and a trip unit providing the trip signal to the means for responding, the trip unit comprising: a power supply, a first terminal, a second terminal, a conductor electrically connected between the first and second terminals, the conductor adapted to generate heat responsive to current flowing through the conductor, the conductor having a temperature, means for providing an electrical signal representative of the temperature of the conductor, and means for generating the trip signal responsive to the electrical signal.

The means for providing an electrical signal may be a diode disposed proximate the conductor for heating thereby, the diode electrically interconnected with the power supply, the diode adapted to provide a voltage representative of the temperature of the conductor.

As another aspect of the invention, a circuit breaker comprises: separable contacts; an operating mechanism for opening and closing the separable contacts, the operating mechanism including a latch for tripping open the separable contacts; means for responding to a trip signal and activating the latch of the operating mechanism; and a trip unit providing the trip signal to the means for responding, the trip unit comprising: a first terminal, a second terminal, a conductor electrically connected between the first and second terminals, a current transformer mounted about the conductor, the current transformer having an output with a first signal representative of current flowing through the conductor, a power supply having an input electrically interconnected with the output of the current transformer, the power supply having a first output with a second signal representative of the current flowing through the conductor, the power supply having a second output with a voltage, and a trip circuit electrically interconnected with the first and second outputs of the power supply, the trip circuit powered from the voltage of the power supply, the trip circuit adapted to generate a trip signal for the circuit interrupter responsive to the second signal representative of the current flowing through the conductor.

As another aspect of the invention, a circuit breaker comprises: separable contacts; an operating mechanism for opening and closing the separable contacts, the operating mechanism including a latch for tripping open the separable contacts; means for responding to a trip signal and activating the latch of the operating mechanism; and a trip unit providing the trip signal to the means for responding, the trip unit comprising: a first terminal, a second terminal, a conductor having a first leg and a second leg, the first leg electrically interconnected with the first terminal and the second leg electrically interconnected with the second terminal, a current transformer mounted on one of the legs of the conductor, the current transformer outputting a signal representative of current flowing through the conductor, and a trip circuit adapted to generate a trip signal for the circuit interrupter responsive to the signal representative of the current flowing through the conductor.

The conductor may be a U-shaped conductor, and the current transformer may include a magnetic core mounted on one of the legs of the U-shaped conductor, with the magnetic core having an opening, and the other one of the legs of the U-shaped conductor passing through the opening. The current transformer may include a winding having a plurality of turns about the magnetic core, with the winding outputting the signal representative of the current flowing through the conductor.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described in connection with a trip unit for a circuit interrupter, such as a circuit breaker, although it will be appreciated that the trip unit may be employed with a wide range of circuit switching devices, such as, for example, a contactor that can be used to turn a load on or off.

Figure 1:
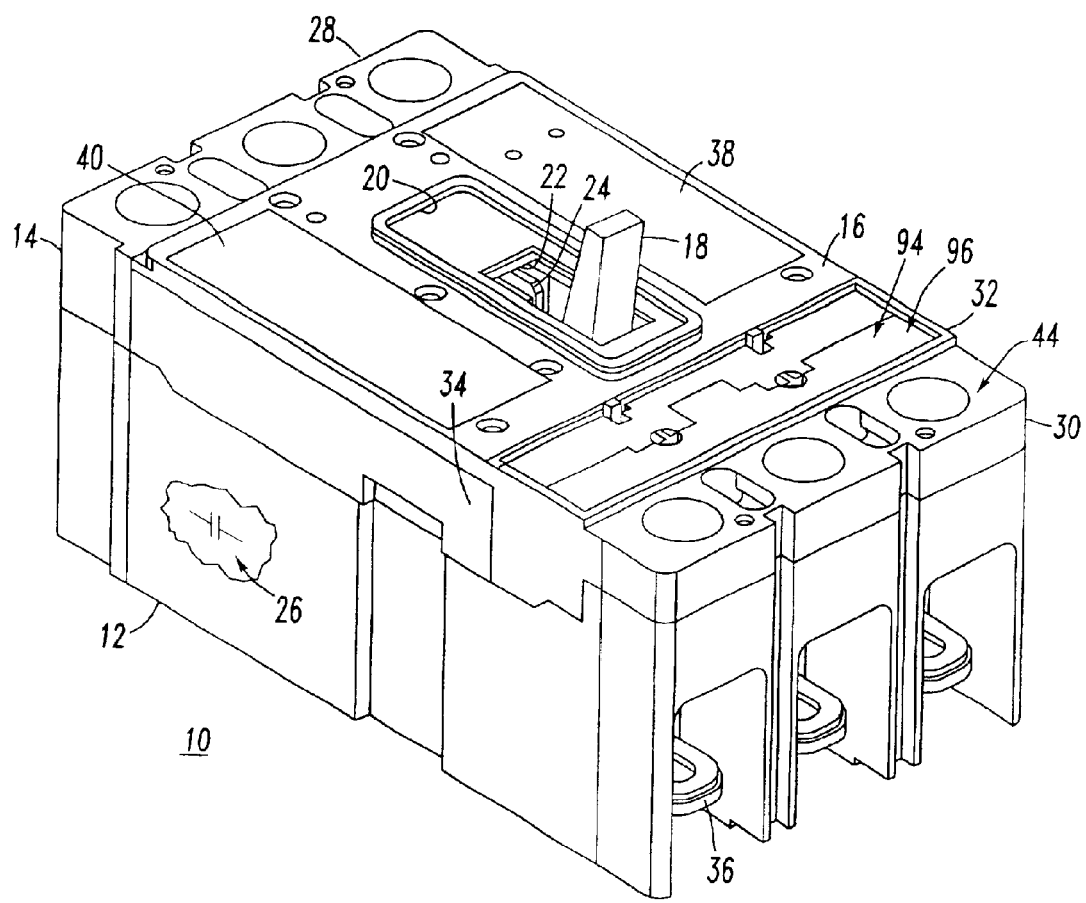
FIG. 1 is an isometric view of a molded case circuit breaker including a trip unit in accordance with the present invention.

FIG. 1 shows a circuit interrupter, such as a molded case circuit breaker 10, having a main base 12 and a primary cover 14. Attached to the primary cover 14 is a secondary cover 16. A handle 18 extends through a secondary escutcheon 20 in the secondary cover 16 and an aligned primary escutcheon 22 in the primary cover 14. An operating mechanism 24 is interconnected with the handle 18 for opening and closing separable main contacts 26 in a manner described in U.S. Pat. No. 6,137,386, which is incorporated by reference herein. The circuit breaker 10 has a line end 28 and a load end 30 and includes a removable trip unit 32 (FIG. 2) in accordance with the present invention. The removable trip unit 32 has an underlapping lip 34. There are also depicted a load terminal 36, a right side accessory region or pocket 38 and a left side accessory pocket or region 40.

Figure 2:
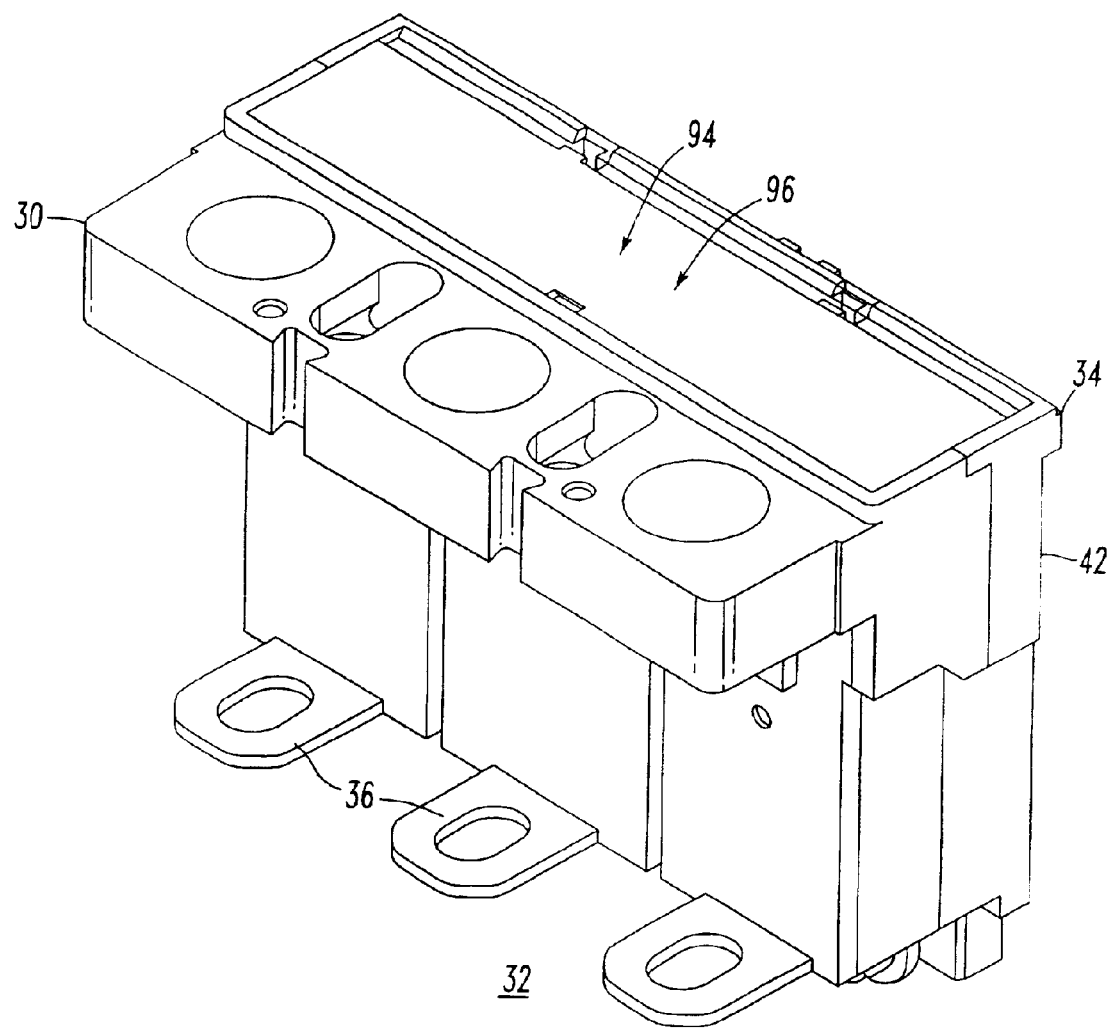
FIG. 2 is an isometric view of the trip unit of FIG. 1.
Figure 3:
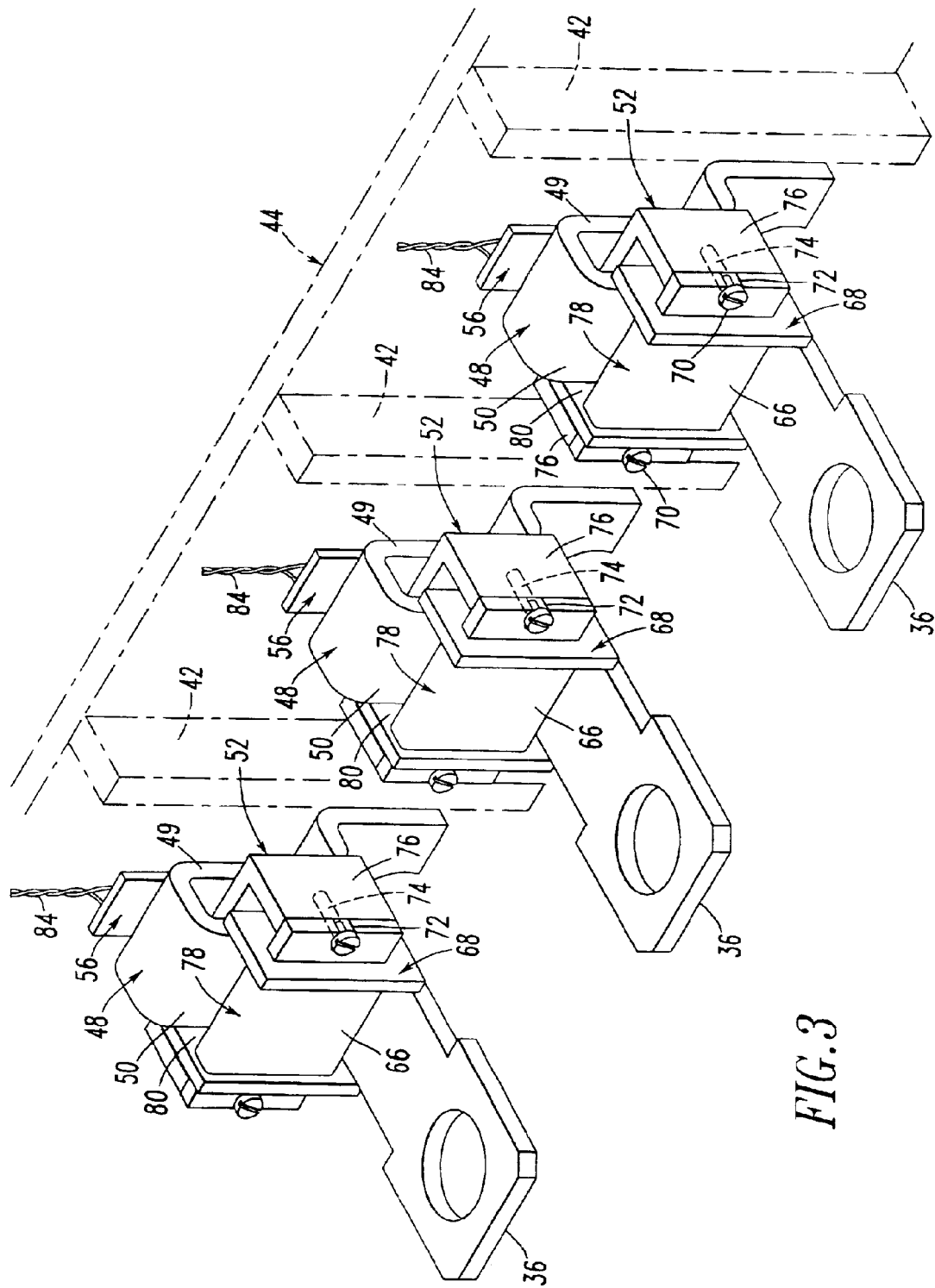
FIG. 3 is an isometric view of the rear portion of the trip unit of FIG. 2 as viewed from the front.

Referring now to FIG. 3, as well as FIGS. 1 and 2, the other side or portion or back portion 42 of case 44 of the trip unit 32 (FIG. 2) is shown along with the load terminals 36. The terminals 36 are terminated in a conductor, such as angularly displaced U-shaped metal heater 48 (FIG. 4), which will be described in greater detail hereinafter.

Figure 4:
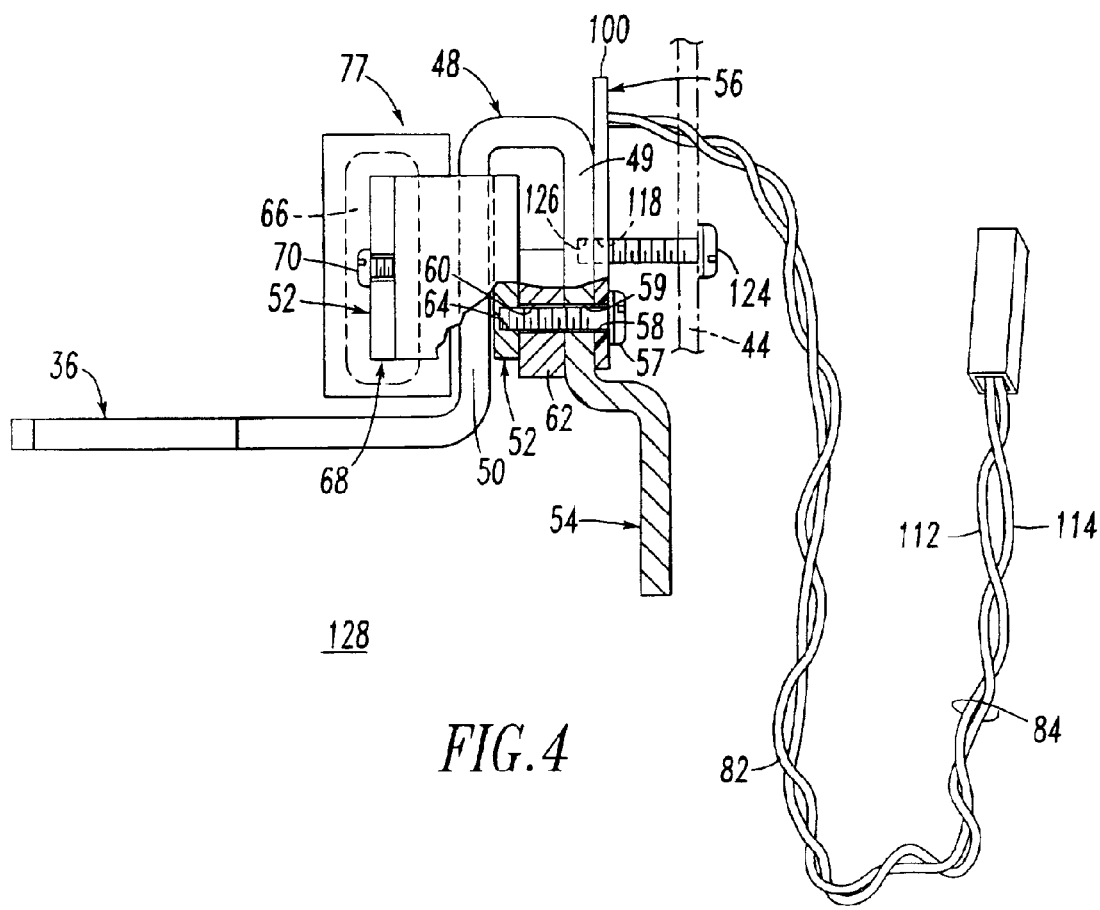
FIG. 4 is a vertical elevation view, with some parts shown in cross-section, of the load terminal, metal heater, magnetic core, circuit breaker interface terminal, and temperature sensor of FIG. 3.

FIG. 4 shows one of the load terminals 36, the U-shaped metal heater 48 having legs 49,50, a U-shaped magnetic yoke 52 (best shown in FIG. 3), circuit breaker interface terminal 54, and temperature sensor 56. As best shown in FIG. 3, one leg 50 of the heater 48 is disposed between the legs 76 of the U-shaped magnetic yoke 52. The conductor or heater 48 is adapted to generate heat responsive to the current flowing therethrough and, thus, has a temperature above ambient temperature. As best shown in FIG. 4, the first leg 49 is electrically interconnected with the circuit breaker interface terminal 54, and the second leg 50 is electrically interconnected with the load terminal 36.

Figure 6:
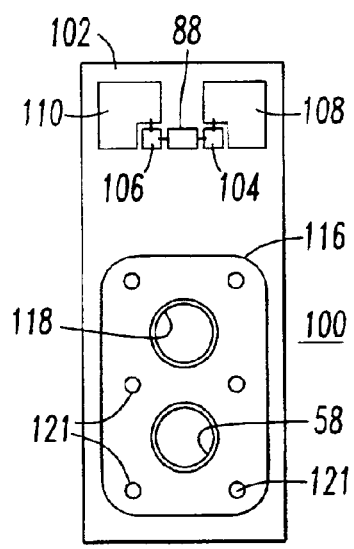
FIGS. 6 and 7 are front and rear plan views of the printed circuit board for the temperature sensor of FIG. 4.

As shown in FIGS. 3 and 4, the magnetic yoke 52 is mounted on the leg 49 of the heater 48 by a fastener, such as screw 57, which passes through a first opening 58 of the temperature sensor 56 (printed circuit board (PCB) 100 of FIG. 6), through an opening 59 of the first leg 49 of the heater 48, through an opening 60 of a spacer 62, and into a threaded opening 64 of the yoke 52. A suitable gap is maintained between the yoke 52 and the second leg 50 of the heater 48.

A winding 66 has a plurality of turns about a magnetic member 68. The member 68 is secured at either end by fasteners 70, which pass through notches 72 to engage threaded openings 74 in the legs 76 of the yoke 52. It is this U-shaped magnetic yoke 52, in combination with the magnetic member 68, which becomes magnetized in relationship to the electrical current flowing through the circuit breaker interface terminal 54, the heater 48 and the load terminal 36. The magnetic member 68 and magnetic yoke 52 form a magnetic core 77, and the winding 66 and the magnetic core 77 form a current transformer (CT) 78 having an opening 80. The leg 50 of the heater 48 passes through the opening 80, such that the winding 66 outputs a signal 162 on twisted pair conductors 132 representative of the current flowing through the U-shaped heater 48. In the exemplary embodiment, for purposes of illustration, but not limitation, the winding is made of 34 AWG wire and has about 1500 turns about the member 68.

Figure 5:
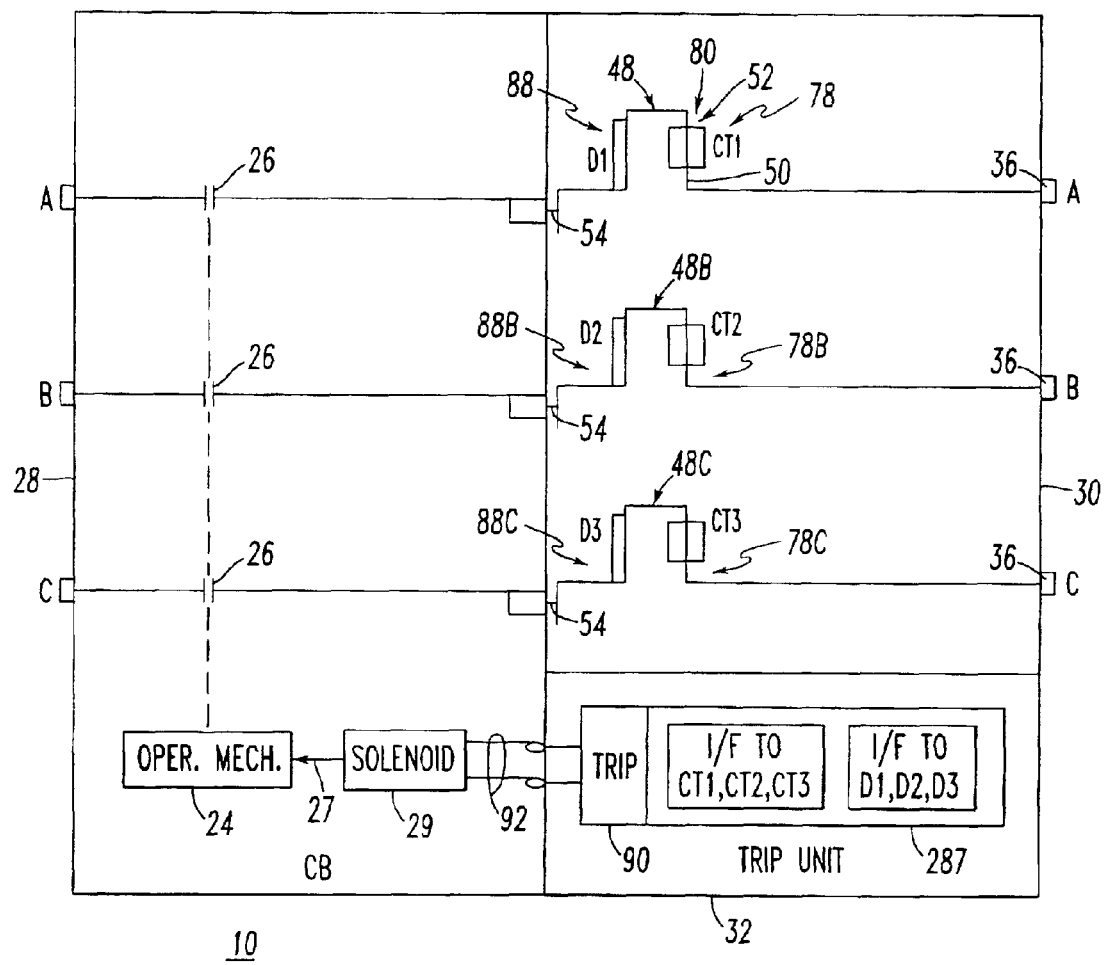
FIG. 5 is a block diagram of the circuit breaker and trip unit of FIG. 1.

FIG. 5 shows the circuit breaker (CB) portion and trip unit 32 of the circuit interrupter 10 of FIG. 1. Although a three-phase circuit interrupter 10 is shown, the invention is applicable to circuit interrupters having one, two, three or more phases. The operating mechanism 24, which opens and closes the separable contacts 26, includes a latch 27 for tripping open such contacts. A suitable trip mechanism, such as a trip solenoid 29 or flux transfer device 310 (FIG. 10), responds to a trip signal 92 and activates the operating mechanism latch 27.

The trip unit 32 includes a power supply 86 (shown in FIG. 8), one or more circuit breaker interface terminals 54, and one or more corresponding load terminals 36. For each pair of the terminals 54,36, a conductor, such as the exemplary U-shaped heater 48 (for phase A), is electrically connected between that pair of terminals, and is adapted to generate heat responsive to current flowing through the heater 48. For each of the heaters 48,48B,48C, a suitable temperature sensor, such as a silicon diode 88,88B,88C, respectively, is disposed proximate the corresponding heater for heating thereby. Although a silicon diode is disclosed, other forward biased PN junctions could be used, such as, for example, gallium arsenide. Alternatively, any suitable active or passive temperature measuring or sensing devices (e.g., RTDs (resistive temperature detectors), various metals (e.g., copper, nickel, platinum) having resistance, voltage or current characteristics versus temperature) may be employed. As discussed below in connection with FIG. 9, the diode (D1) 88 is electrically interconnected with the power supply 86 and is adapted to provide a voltage representative of the temperature of the heater 48. As discussed above in connection with FIGS. 3 and 4, for each of the heaters 48, the leg 50 of the heater 48 passes through the opening 80 of the current transformer (CT1) 78. The exemplary trip unit 32 further includes the heaters 48B,48C, diodes 88B,88C and CTs 78B,78C for phases B,C, respectively.

As discussed below in connection with FIGS. 8 and 9, the trip unit 32 includes a trip circuit 90 for generating the trip signal 92 for the circuit interrupter 10. The trip circuit 90 includes an instantaneous trip circuit 94 (FIG. 8) adapted to generate a plurality of trip signals responsive to the signals, such as 162, of the CTs 78,78B,78C, a thermal trip circuit 96 (FIG. 9) adapted to generate a plurality of trip signals responsive to the voltage 82 (FIG. 9) of the diodes 88,88B, 88C, and an OR circuit 98 (FIG. 8) for combining the instantaneous and thermal trip signals 200,258 and outputting the combined trip signal 262.

Figure 7:
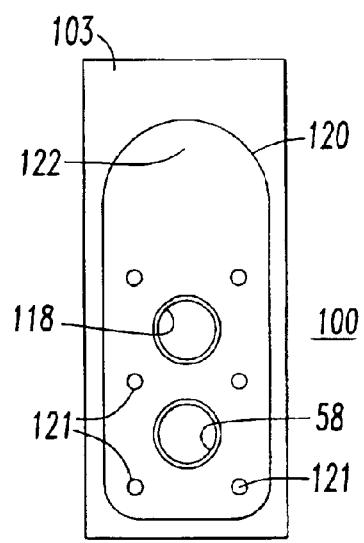

FIGS. 6 and 7 show front 102 and rear 103 plan views, respectively, of the PCB 100 for the temperature sensor 56 of FIG. 4. As shown in FIG. 6, the diode 88 is suitably surface-mounted to a pair of mounting pads 104,106. Electrically connected to the diode mounting pads 104,106 are relatively larger mounting pads 108,110, which pads are suitably adapted for solder electrical connection to the individuals conductors 112,114, respectively, of the twisted pair 84 of FIG. 4. Also disposed on the front 102 of the PCB 100 is a first thermal pad 116 having two plated through openings 58,118 therethrough. As shown in FIG. 7, a second, somewhat larger, thermal pad 120 is electrically and thermally connected with the first thermal pad 116 by the openings 58,118. Preferably, a plurality of relatively smaller plated through openings 121 extend between the first and second thermal pads 116,120, in order to enhance the thermal conductivity therebetween. The second thermal pad 120 has a portion 122, which extends below the rear portion of the diode 88 of FIG. 6, in order to improve the thermal conductivity between the pad portion 122 and the proximate diode 88. As discussed above in connection with FIG. 4, the temperature sensor PCB 100 is secured to the heater leg 49 by the fastener 57 through the opening 58, with the rear thermal pad 120 electrically and thermally engaging that leg 49. In this manner, the temperature of the heater 48 is transferred from the leg 49 to the pad 120, through the pad portion 122, through the relatively thin PCB 100, and to the diode 88.

As shown in FIG. 4, a second screw 124 passes through the second opening 118 of the PCB 100 and engages a second threaded opening 126 of the heater leg 49, in order to hold the assembly 128 of FIG. 4 to the case 44 of FIG. 3 (as shown in phantom in FIG. 4).

Figure 8:
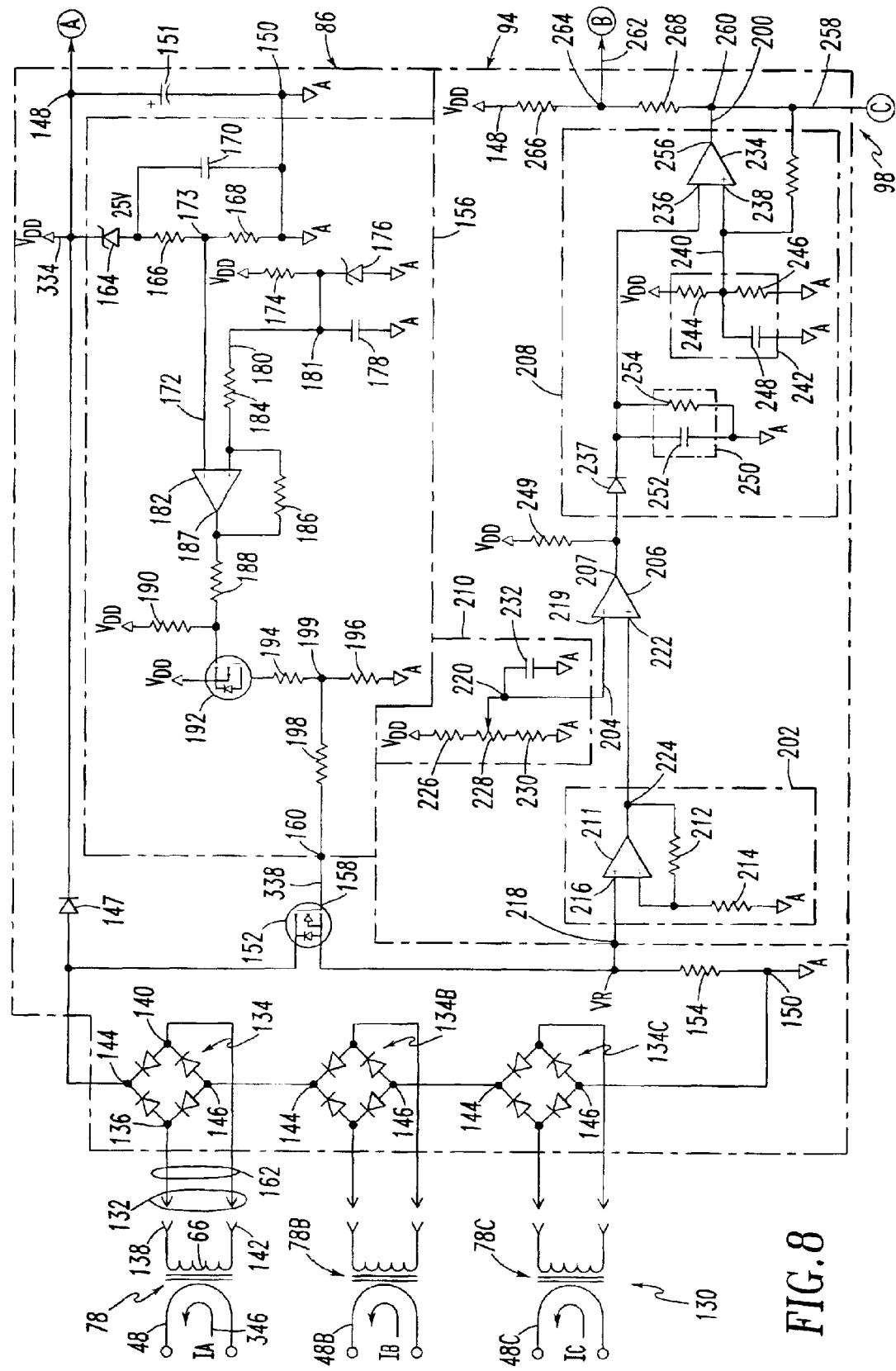
FIG. 8 is a schematic diagram of the current sensing, power supply and instantaneous trip circuitry of the three-phase trip unit of FIG. 2.

Referring to FIG. 8, the current sensing circuitry 130, the power supply 86 and the instantaneous trip circuitry 94 of the three-phase trip unit 32 of FIGS. 2 and 5 are shown. The current sensing circuitry 130 includes the three CTs 78,78B, 78C for the respective phases A,B,C. In turn, the CT windings, such as 66, are electrically interconnected with the power supply 86 by suitable electrical connections (e.g., twisted pair conductors 132). As discussed above in connection with FIG. 4, the CTs, such as 78, are mounted on one leg 49 and about the other leg 50 of the respective heater conductors, such as 48, and provide an output at nodes 138,142 with a first signal 162 being representative of phase current, such as $I_A$, flowing through the conductor. Mounting the CT 78 on one of the legs (e.g., 49) of the heater conductor 48 simplifies the assembly of the trip unit 32, since another structure need not be provided to support the CT 78.

As shown with phase A, for each of the three phases, the power supply 86 includes a full wave bridge (FWB), such as 134, having a first input 136 electrically connected to the first node 138 of the CT 78, a second input 140 electrically connected to the second node 142 of the CT 78, a first output 144, and a second output 146. Phases B and C similarly include respective FWBs 134B and 134C, with the first output 144 of FWB 134B being electrically connected to the second output 146 of FWB 134, and with the first output 144 of FWB 134C being electrically connected to the second output 146 of FWB 134B. The first output 144 of FWB 134 is electrically connected to the anode of a diode 147. The cathode of diode 147 is, in turn, electrically connected to a first node 148 (VDD) of the power supply 86. A second power supply node 150 defines a ground reference, which is electrically connected to the second output 146 of FWB 134C. A suitable capacitor 151 is electrically connected between the power supply nodes 148,150.

The power supply 86 further includes an N-channel FET transistor 152, a resistor 154 and a switching regulator 156, which controls the FET input or gate 158. As will be described below in connection with FIG. 13B, the power supply 86 functions to provide a first output with a suitable voltage $V_R$ (with respect to the ground node 150) across the resistor 154, which voltage (assuming no phase B or phase C current) generally follows and suitably represents the current $I_A$ flowing through the heater conductor 48. The power supply 86 also functions to provide a second output with the suitable direct current (DC) output voltage VDD between the nodes 148,150. The switching regulator 156 is electrically connected between the first and second power supply nodes 148,150 and has an output 160, which is electrically connected to the FET gate 158. The resistor 154 is electrically interconnected between the first output 144 of the FWB 134 and the second output 146 of the FWB 134C by the source and drain of the FET 152.

Preferably, the switching regulator 156 is designed such that the FET 152 is switched on and off with a duty cycle of about 90% during normal operation, in order that the voltage $V_R$ across the resistor 154 substantially represents the peak value of the three CT signals, such as 162, which follows the phase A current flowing through the heater 48. The switching regulator 156 includes the series combination of zener diode 164, resistor 166 and resistor 168 between the power supply nodes 148,150. A capacitor 170 is in parallel with the divider formed by the series combination of the resistors 166,168. These components provide a power supply voltage sense signal 172 at the node 173 formed by the resistors 166,168.

The series combination of resistor 174 and zener diode 176 between the power supply nodes 148,150, with capacitor 178 in parallel with the zener diode 176, provide a voltage reference 180 at node 181. A comparator 182 has an inverting input (−) electrically connected to the node 173 and a non-inverting input (+) electrically connected through resistor 184 to the node 181. Resistor 186 provides a feedback path from the comparator output 187 to the comparator non-inverting input (+). A first inversion of the signal at the comparator output 187 is provided by the resistor 188, resistor 190, P-channel FET 192, and resistors 194,196. A second inversion of the comparator output 187 is then provided by resistor 198 and the P-channel FET 152.

Whenever the voltage sense signal 172 exceeds the reference voltage 180, as adjusted by the hysteresis resistor 186, the comparator output 187 goes low, the voltage at the node 199 between the resistors 194,196 goes high, and the FET 152 is turned on to divert current to the resistor 154, which current had passed through the diode 147 and, thus, to the power supply capacitor 151. Otherwise, whenever the reference voltage 180 exceeds the voltage sense signal 172, as adjusted by the hysteresis resistor 186, the comparator output 187 goes high, the voltage at the node 199 between the resistors 194,196 goes low, and the FET 152 is turned off to permit the current to flow through the diode 147 to the capacitor 151 between the power supply nodes 148,150.

Preferably, the resistor 154 has a suitably low resistance (e.g., without limitation, about 0.1 Ω in the exemplary embodiment), in order that suitable current is diverted from the FWBs 134,134B,134C, such that the voltage VDD at node 148 is suitably controlled. The instantaneous trip circuit 94 is adapted to generate a first trip signal 200 responsive to the resistor voltage $V_R$, which is representative of the highest peak value of the phase currents $I_A$, $I_B$ or $I_C$ flowing through the heaters 48,48B,48C, respectively. The instantaneous trip circuit 94 includes an amplifier circuit 202, a reference voltage 204, a comparator 206 having an output 207, a circuit 208 generating the trip signal 200 responsive to the comparator output 207, and a circuit 210 for adjusting the reference voltage 204, in order to provide an instantaneous trip adjustment. The amplifier circuit 202 includes a suitable amplifier 211 and resistors 212,214. The non-inverting input (+) 216 of the amplifier 211 is electrically connected to the first output 218 of the power supply 86. In the exemplary embodiment, in view of the relatively low value of resistance of resistor 154, the resistors 212,214 are selected to provide a relatively high value of amplifier gain (e.g., without limitation, about 100 in the exemplary embodiment).

The comparator 206 has an inverting input (−) 219, which is electrically connected to the output 220 of the circuit 210 providing the reference voltage 204. The non-inverting comparator input (+) 222 is electrically connected to the output 224 of the amplifier 211. The circuit 210 includes the series combination of resistor 226, potentiometer 228 and resistor 230 electrically connected between the power supply nodes 148,150. A filter capacitor 232 suitably filters the circuit output 220. The potentiometer 228 advantageously adjusts the reference voltage 204 at output 220, in order to provide the instantaneous trip adjustment.

The circuit 208 includes a comparator 234 having an inverting input (−) 236, which is electrically connected to the output 207 of the comparator 206 by diode 237. The non-inverting comparator input (+) 238 accepts a suitable reference voltage 240 from a divider circuit 242 including resistors 244,246 and capacitor 248. A resistor 249, the diode 237, and a circuit 250 including the parallel combination of capacitor 252 and resistor 254 suitably peak-detects and filters the comparator output 207, in order to avoid spurious trip signals. When the output 207 has a positive voltage, the capacitor 252 charges through the diode 238. Otherwise, the capacitor 252 is discharged through the bleeder resistor 254. In turn, whenever the integrated voltage at the inverting comparator input (−) 236 exceeds the reference voltage 240 at the non-inverting comparator input (+) 238, the open collector output 256 of the comparator 234 switches low, in order to provide the trip signal 200.

As discussed below in connection with FIG. 9, another trip signal 258 is provided by the thermal trip circuit 96. That signal 258 is wire-ORed with the instantaneous trip signal 200 at node 260. In turn, a combined trip signal 262 is provided at node 264 through the series combination of the pull-up resistors 266,268, which combination is electrically connected between the power supply node 148 and the node 260. As explained below in connection with FIG. 10, the trip signal 262 is employed as the trip signal for the circuit interrupter 10 of FIG. 1.

Three important features of the exemplary trip unit 32 include: (1) overcurrent protection based on the peak current sensing of the highest phase currents $I_A$, $I_B$ or $I_C$ through the CTs 78,78B,78C and FWBs 134,134B,134C, respectively, and the power supply 86 for the trip circuit 94 of FIG. 8; (2) overload protection based on the RMS value of the current which heats the heater 48; and (3) the provision for thermal memory through the heater 48 (FIG. 4) thermal mass. The third feature is important in the event that the circuit interrupter 10 of FIG. 1 is reset immediately after it experiences an overload trip. Hence, the new time-to-trip starts from a "hot" value and not a "cold" value. Although a conventional thermal-magnetic trip unit provides these two features, it is believed that the present trip unit 32 provides reduced manufacturing and adjustment costs with respect to known prior trip units, without requiring the use of conventional bimetals and/or ambient compensation bimetals.

Figure 9:
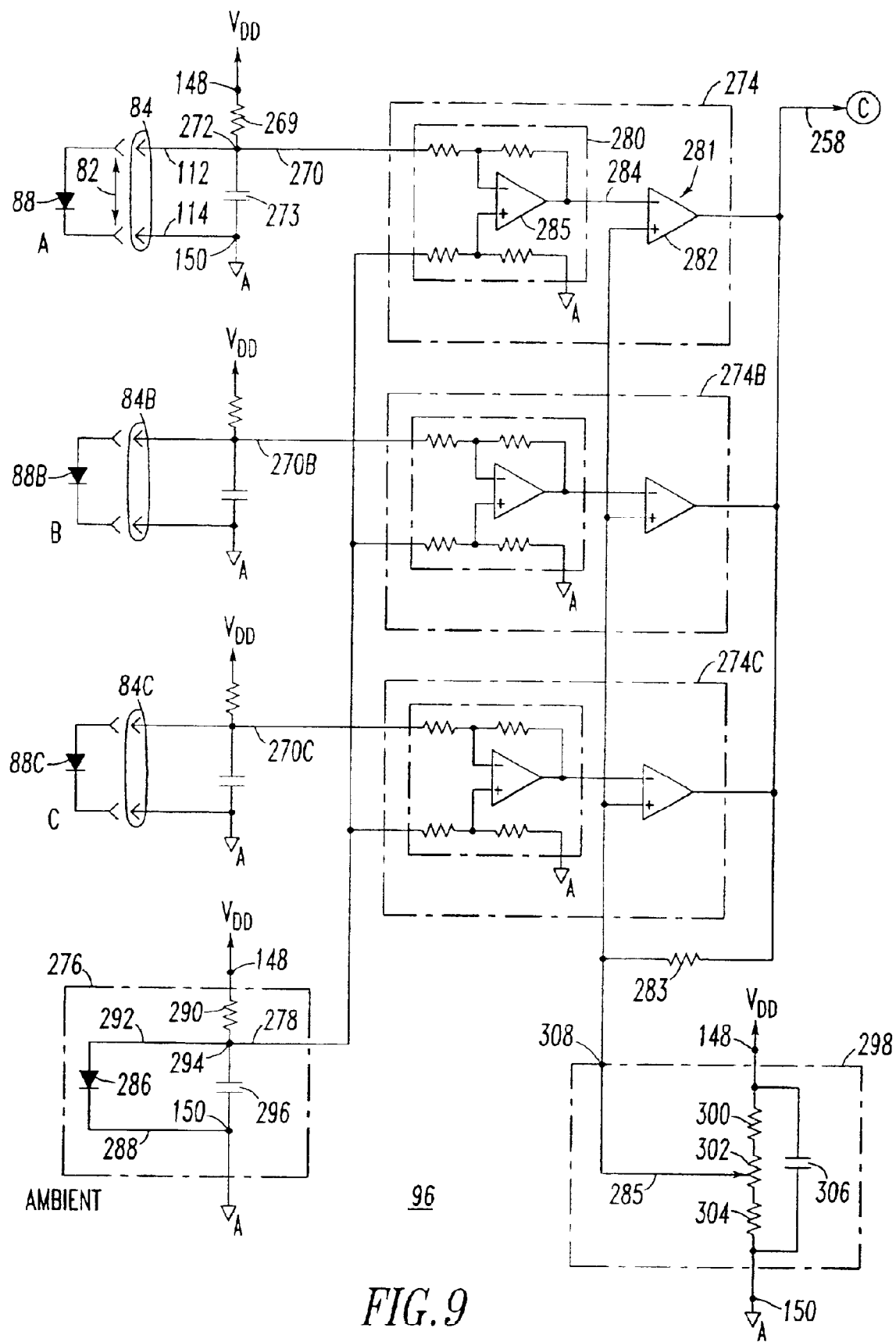
FIG. 9 is a schematic diagram of the temperature sensing and thermal trip circuitry of the three-phase trip unit of FIG. 2.

As shown in FIG. 9, the thermal trip circuit 96 is electrically interconnected with and powered from the first node 148 and the second node 150 of the power supply 86 of FIG. 8. The circuit 96 is adapted to sense the temperature of the heater conductors 48,48B,48C (FIGS. 5 and 8) and generate the trip signal 258 responsive to the signals 84,84B,84C from the diodes 88,88B,88C, respectively. The diodes, such as 88, are disposed proximate the heater conductors, such as 48, for heating thereby. The diode 88 is electrically interconnected through the conductor 114 with the second node 150 of the power supply 86 and with one side of resistor 269 through the conductor 112. The other side of the resistor 269 is electrically connected to the power supply node 148. The diode 88 is adapted to provide a voltage 270 at a node 272 between the resistor 269 and a capacitor 273, which is electrically connected in parallel with the diode 88. The voltage 270 is representative of the temperature of the heater conductor 48. In turn, a circuit 274 generates the trip signal 258 responsive to the diode voltage 270. In a similar manner, signals 270B,270C from diodes 88B,88C are applied to circuits 274B,274C, respectively, in order to generate the trip signal 258 responsive to the respective diode voltages 270B,270C.

The circuit 274 includes a circuit 276 for providing a first reference voltage 278, a difference amplifier 280 for generating a difference between the first reference voltage 278 and the diode voltage 270, and a circuit 281 including a comparator 282 having an open collector output for providing the trip signal 258 when the difference amplifier output voltage 284 is greater than a second reference voltage 285. A resistor 283, which is electrically connected between the output of comparator 282 and its non-inverting input (+), provides suitable hysteresis for the voltage 285.

In accordance with a preferred practice of the present invention, the circuit 276 includes a diode 286, which is adapted to sense ambient temperature for the circuit interrupter 10. In this regard, the diode 286 is mounted on the printed circuit board (PCB) 287 for the trip circuit 32 and apart from the heater conductors 48,48B,48C of FIG. 5. The diode 286 is electrically interconnected through PCB conductor 288 with the second power supply node 150 and with one side of resistor 290 through PCB conductor 292. The other side of the resistor 290 is electrically connected to the power supply node 148. The diode 286 is adapted to provide the voltage 278 at a node 294 between the resistor 290 and a capacitor 296, which is electrically connected in parallel with the diode 286. The voltage 278 is representative of ambient temperature. In turn, the difference amplifier 280 provides the output voltage 284 based upon the difference between the temperature of the heater conductor 48 and the ambient temperature.

A circuit 298 provides for suitable adjustment of the second reference voltage 285. The circuit 298 includes the series combination of resistor 300, potentiometer 302 and resistor 304 electrically connected between the power supply nodes 148,150. A filter capacitor 306 suitably filters the voltage 148 with respect to the ground 150. The potentiometer 302 adjusts the reference voltage 285 for output 308, in order to provide the thermal trip adjustment, which is based upon the magnitude of the difference between the temperature of the heater conductor 48 and the ambient temperature, as determined by the comparators, such as 282.

The four analog inputs from the four diodes 286 and 88,88B,88C are employed to measure the circuit breaker ambient temperature as well as the temperature of the three heaters conductors 48,48B,48C associated with the three phases A,B,C, respectively. The exemplary trip unit 32 employs these heater conductors, but not conventional bimetals. The heater temperature is directly measured electronically through the exemplary current biased silicon diodes 88,88B,88C, although a wide range of active or passive electronic temperature sensing and/or monitoring devices may be employed.

The voltage drop across any particular one of the silicon diodes 88,88B,88C,286 operating at a suitably fixed current (e.g., from the power supply node 148 through the resistor 269 to the diode 88 and back to the power supply node 150) decreases about 2 mV/° C. Thus, the voltage drop across a simple diode is employed to measure temperature. For suitably accurate measurements, it is desirable to establish the ambient reference voltage 278, in order that voltage differences rather than absolute voltage values are employed to determine heater and trip unit temperatures. The exemplary circuit 276 measures ambient temperature, in order that the trip point can be based on the difference in heater and ambient temperature. This allows the current trip level to be fairly constant, independent of temperature.

Figure 10:
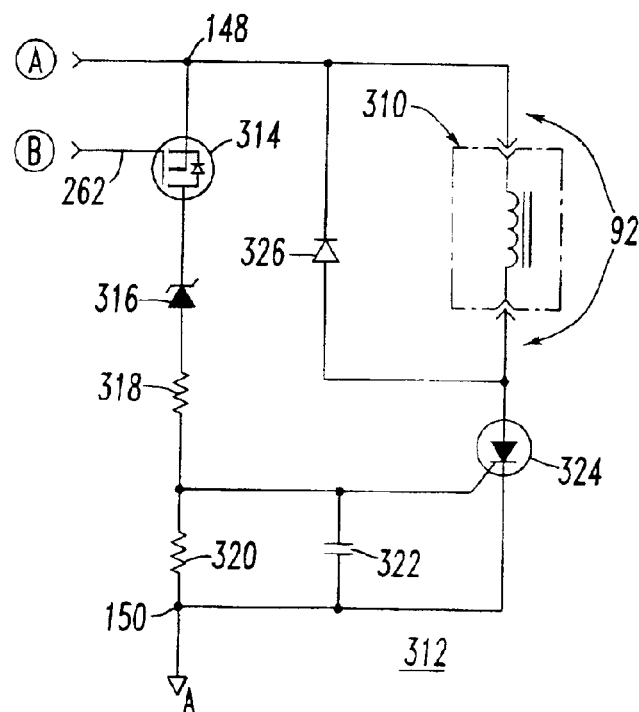
FIG. 10 is a schematic diagram of the trip mechanism and driver of the three-phase trip unit of FIG. 2.

FIG. 10 shows the flux transfer device 310 (shown in phantom line drawing) and the trip driver circuit 312 of the three-phase trip unit 32 of FIG. 2. Although an exemplary flux transfer device 310 is shown, any suitable tripping mechanism, such as, for example, a solenoid may be employed.

The exemplary trip driver circuit 312 includes a P-channel FET 314, a zener diode 316, resistors 318,320, a capacitor 322, a silicon controller rectifier (SCR) 324, and a diode 326, which protects the flux transfer device 310. In response to the active state of combined trip signal 262 of FIG. 8, the FET 314 energizes the series combination of the zener diode 316 and resistors 318,320 from the first power supply node 148. This produces a sufficient voltage across the parallel combination of the resistor 320 and capacitor 322 to trigger the gate of the SCR 324. In turn, the SCR 324 energizes the flux transfer device 310 from the first power supply node 148, which device 310 responsively activates the operating mechanism latch 27 of FIG. 5.

Figure 11:
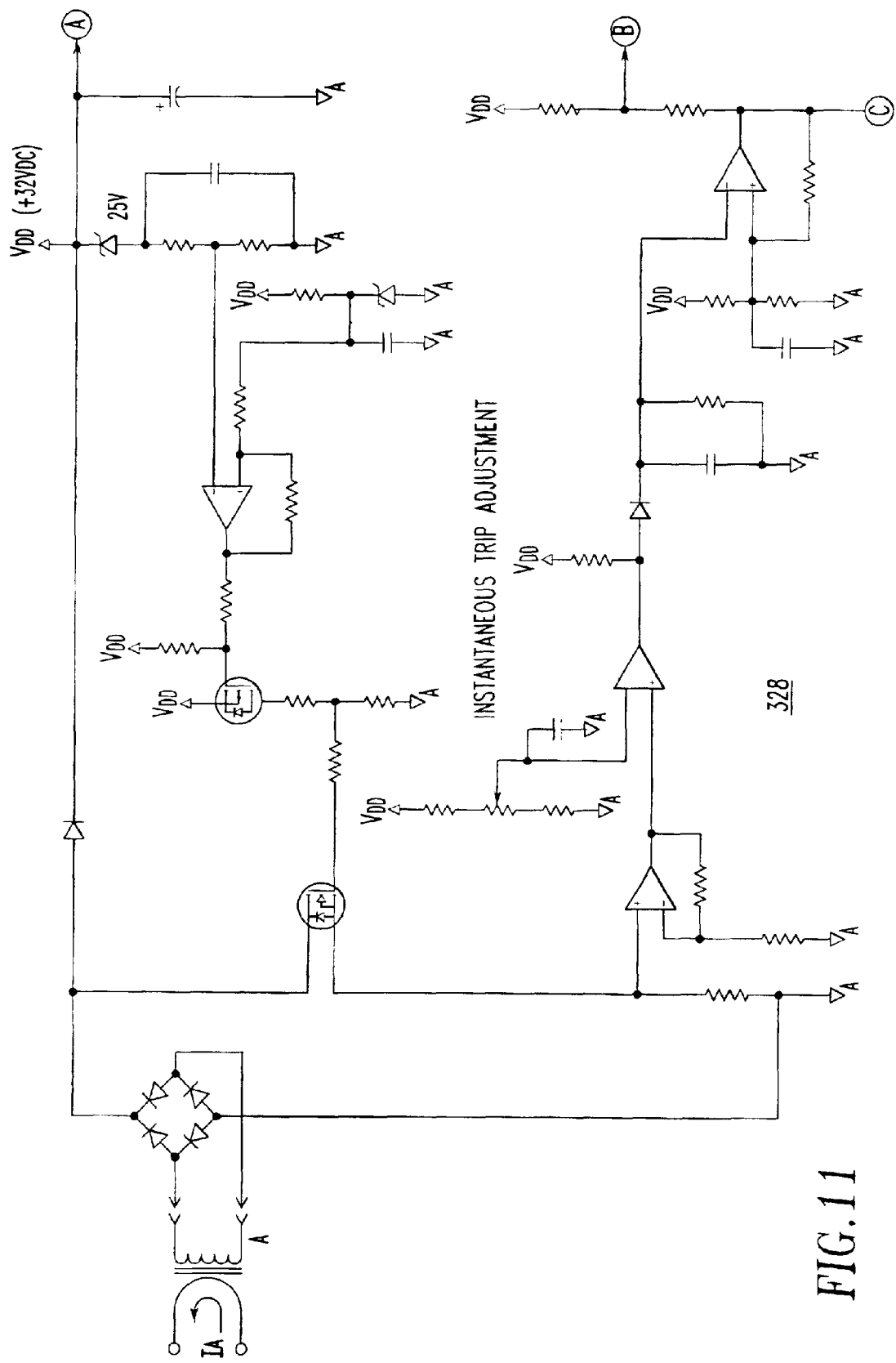
FIG. 11 is a schematic diagram of the current sensing, power supply and instantaneous trip circuitry of a single-phase trip unit in accordance with an embodiment of the present invention.

FIG. 11 is a simplified version of FIG. 8 and shows the current sensing, power supply and instantaneous trip circuitry 328 for a single-phase trip unit.

Figure 12:
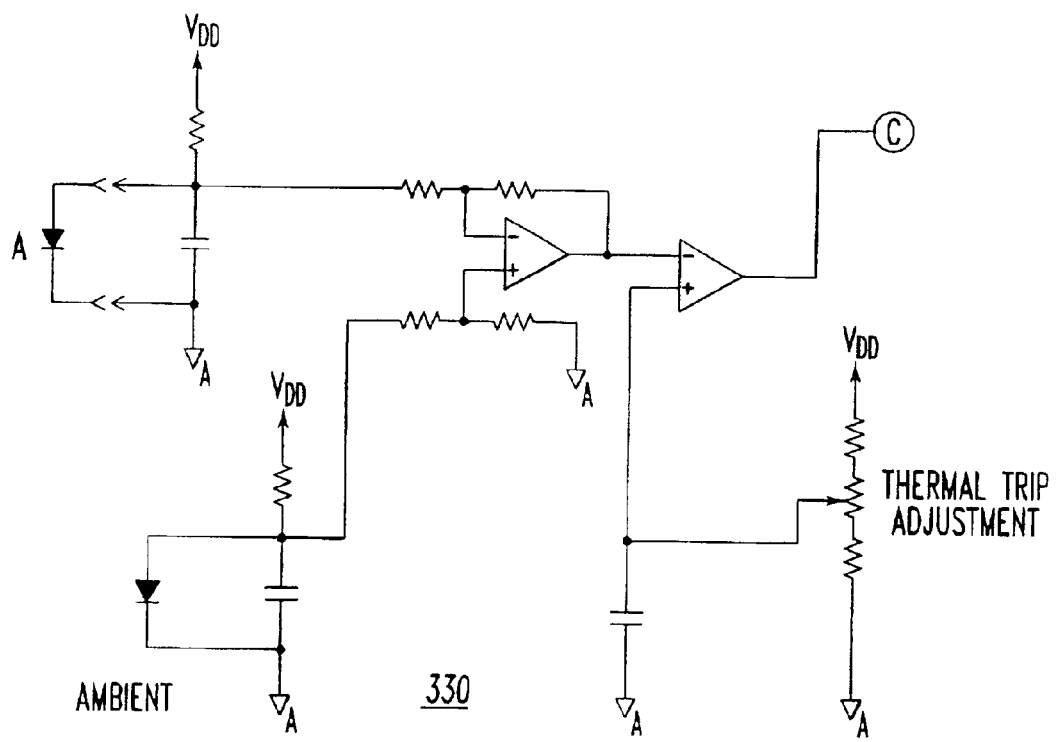
FIG. 12 is a schematic diagram of the temperature sensing and thermal trip circuitry of a single-phase trip unit in accordance with the embodiment of FIG. 11.

FIG. 12 is a simplified version of FIG. 9 and shows the temperature sensing and thermal trip circuitry 330 of a single-phase trip unit.

Figure 13A:
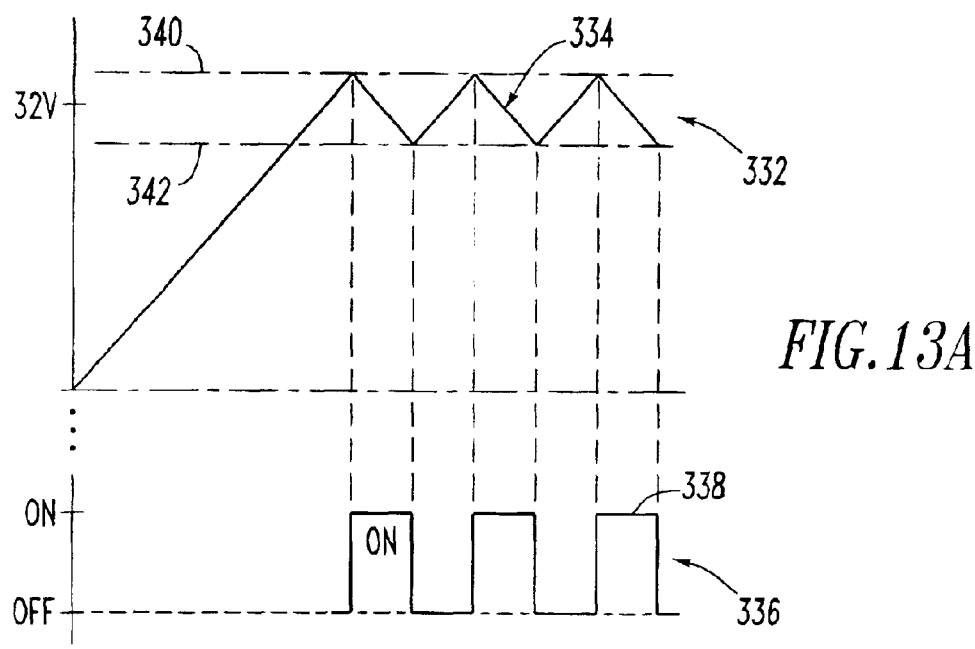
FIG. 13A shows plots of the direct current (DC) output voltage and the FET gating signal of the power supply of FIG. 8.

Referring to FIGS. 8 and 13A, FIG. 13A shows a plot 332 of the direct current (DC) output voltage (VDD) 334 at node 148, and a plot 336 of the FET gating signal 338 of the FET 152. The exemplary voltage (VDD) 334 is about 32 VDC and varies between upper and lower thresholds 340,342.

Figure 13B:
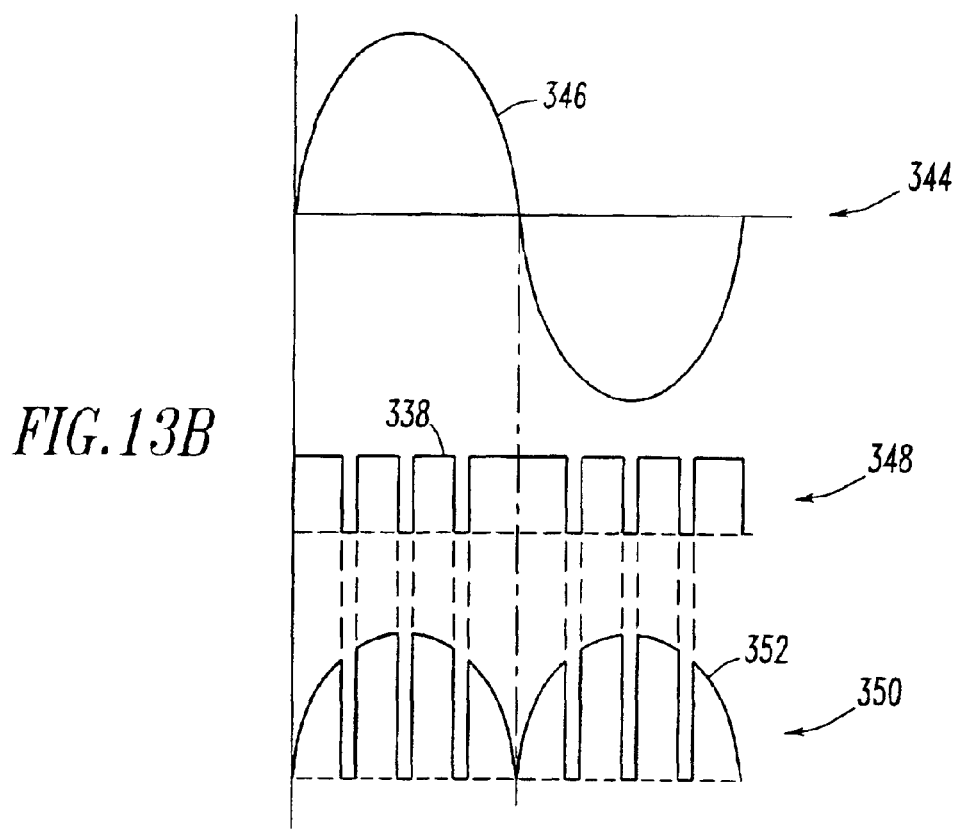
FIG. 13B shows plots of the phase A current, the FET gating signal and the resistor voltage of the power supply of FIG. 8.

Referring to FIGS. 8 and 13B, FIG. 13B shows a plot 344 of the phase A current 346, a plot 348 (which plot has a different time scale, offset and duty cycle as compared to the plot 336 of FIG. 13A) of the FET gating signal 338 of the FET 152, and a plot 350 of the resistor voltage ($V_R$) 352 of the resistor 154. This shows that the voltage 352 generally follows and suitably represents the current $I_A$ 346 flowing through the phase A heater conductor 48. It will be understood, however, for a three-phase application, that the voltage $V_R$ 352 across the resistor 154 substantially represents the peak values of the three CT signals, such as 162, of the three-phase heaters 48,48B,48C.

During power-up, when the voltage (VDD) 334 is first rising to the upper threshold 340 of FIG. 13A, the FET gating signal 338 is off, the FET 152 of FIG. 8 is off, and the current from the bridges 134,134B,134C is directed through the diode 147, in order to charge the capacitor 151. During this relatively brief power-up period, the voltage $V_R$ 352 of FIG. 13B is essentially zero. During this period, it is not necessary to monitor for an instantaneous trip condition.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A trip unit for a circuit interrupter, said trip unit comprising:

a power supply;

at least one first terminal;

at least one second terminal;

for each pair of said first and second terminals, a conductor electrically connected between said pair of said first and second terminals, said conductor producing heat responsive to current flowing through said conductor, said conductor having a temperature;

for each said conductor, means for providing an electrical signal representative of the temperature of said conductor;

means for generating a trip signal for said circuit interrupter responsive to said electrical signal; and wherein said means for providing an electrical signal includes a diode mounted on a printed circuit board having a thermal pad proximate said diode, said printed circuit board being secured to said conductor, with said thermal pad engaging said conductor.

2. A trip unit for a circuit interrupter, said trip unit comprising:

a power supply;

at least one first terminal;

at least one second terminal;

for each pair of said first and second terminals, a conductor electrically connected between said pair of said first and second terminals, said conductor producing heat responsive to current flowing through said conductor, said conductor having a temperature;

for each said conductor, means for providing an electrical signal representative of the temperature of said conductor;

means for generating a trip signal for said circuit interrupter responsive to said electrical signal;

wherein said means for providing an electrical signal is a diode having a voltage representative of the temperature of said conductor; and wherein said means for generating said trip signal includes means for providing a first reference voltage, means for generating a difference between said first reference voltage and said voltage of said diode, and means for providing said trip signal for said circuit interrupter when said difference is greater than a second reference voltage; and wherein said diode is a first diode; wherein said means for generating said trip signal further includes a second diode for sensing ambient temperature, said second diode electrically interconnected with said power supply, said second diode providing the first reference voltage, in order that said trip signal is generated based upon a difference between the temperature of said conductor and said ambient temperature.

3. A trip unit for a circuit interrupter, said trip unit comprising:

a power supply;

at least one first terminal;

at least one second terminal;

for each pair of said first and second terminals, a conductor electrically connected between said pair of said first and second terminals, said conductor producing heat responsive to current flowing through said conductor, said conductor having a temperature;

for each said conductor, means for providing an electrical signal representative of the temperature of said conductor;

means for generating a trip signal for said circuit interrupter responsive to said electrical signal;

wherein said means for providing an electrical signal is a diode having a voltage representative of the temperature of said conductor, and wherein said means for generating said trip signal includes means for providing a first reference voltage, means for generating a difference between said first reference voltage and said voltage of said diode, and means for providing said trip signal for said circuit interrupter when said difference is greater than a second reference voltage; and wherein said means for generating said trip signal further includes means for adjusting the second reference voltage.

4. A trip unit for a circuit interrupter, said trip unit comprising:

a power supply;

at least one first terminal;

at least one second terminal;

for each pair of said first and second terminals, a conductor electrically connected between said pair of said first and second terminals, said conductor producing heat responsive to current flowing through said conductor, said conductor having a temperature;

for each said conductor, means for providing an electrical signal representative of the temperature of said conductor;

means for generating a trip signal for said circuit interrupter responsive to said electrical signal;

wherein said means for providing an electrical signal is a diode having a voltage representative of the temperature of said conductor; and wherein said means for generating said trip signal includes means for providing a first reference voltage, means for generating a difference between said first reference voltage and said voltage of said diode, and means for providing said trip signal for said circuit interrupter when said difference is greater than a second reference voltage; and wherein said power supply has a first node and a second node, with a voltage between said first and second node; wherein said diode has an anode and a cathode; wherein said means for generating said trip signal further includes a capacitor electrically connected in parallel with said diode and a resistor electrically interconnected between the first node of said power supply and the anode of said diode; and wherein the cathode of said diode is electrically interconnected with the second node of said power supply.

5. A trip unit for a circuit interrupter, said trip unit comprising:

a power supply;

at least one first terminal;

at least one second terminal;

for each pair of said first and second terminals, a conductor electrically connected between said pair of said first and second terminals, said conductor producing heat responsive to current flowing through said conductor, said conductor having a temperature;

for each said conductor, means for providing an electrical signal representative of the temperature of said conductor;

means for generating a trip signal for said circuit interrupter responsive to said electrical signal;

wherein said means for providing an electrical signal is a diode having a voltage representative of the temperature of said conductor; and wherein said means for generating said trip signal includes means for providing a first reference voltage, means for generating a difference between said first reference voltage and said voltage of said diode, and means for providing said trip signal for said circuit interrupter when said difference is greater than a second reference voltage; and wherein said means for generating a difference between the first reference voltage and the voltage of said diode is a difference amplifier.

6. A trip unit for a circuit interrupter, said trip unit comprising:

a first terminal;

a second terminal;

a conductor electrically connected between said first and second terminals;

a current transformer mounted about said conductor, said current transformer having an output with a first signal representative of current flowing through said conductor;

a power supply having an input electrically interconnected with the output of said current transformer, said power supply having a first output with a second signal representative of said current flowing through said conductor, said power supply having a second output with a voltage;

a trip circuit electrically interconnected with the first and second outputs of said power supply, said trip circuit powered from the voltage of said power supply, said trip circuit for generating a third signal which is a trip signal for said circuit interrupter and which is responsive to said second signal representative of said current flowing through said conductor;

wherein said conductor produces heat responsive to said current flowing through said conductor, said conductor having a temperature; and wherein said trip circuit comprises an instantaneous trip circuit for generating a fourth trip signal responsive to said second signal representative of said current flowing through said conductor, a thermal trip circuit for sensing the temperature of said conductor and generating a fifth trip signal, and a circuit responsive to said fourth trip signal of said instantaneous trip circuit and said fifth trip signal of said thermal trip circuit for generating said third trip signal; and wherein said thermal trip circuit comprises a diode disposed proximate said conductor for being heated thereby, said diode electrically interconnected with the second output of said power supply, said diode provide a voltage representative of the temperature of said conductor, said thermal trip circuit further comprises means for generating said fifth trip signal responsive to the voltage of said diode.

7. A trip unit for a circuit interrupter, said trip unit comprising:

a first terminal;

a second terminal;

a conductor electrically connected between said first and second terminals;

a current transformer mounted about said conductor, said current transformer having an output with a first signal representative of current flowing through said conductor;

a power supply having an input electrically interconnected with the output of said current transformer, said power supply having a first output with a second signal representative of said current flowing through said conductor, said power supply having a second output with a voltage;

a trip circuit electrically interconnected with the first and second outputs of said power supply, said trip circuit powered from the voltage of said power supply, said trip circuit for generating a trip signal for said circuit interrupter responsive to said second signal representative of said current flowing through said conductor;

wherein the output of said current transformer has a first node and a second node; wherein the second output of said power supply includes a first node having said voltage and a second node having a ground; and wherein said power supply comprises:

a full wave bridge having a first input electrically interconnected with the first node of said current transformer, a second input electrically interconnected with the second node of said current transformer, a first output, and a second output electrically interconnected with the second node of said power supply, a diode electrically connected between the first output of said full wave bridge and the first node of said power supply, a transistor having an input, a first output and a second output, a resistor electrically interconnected between the first and second outputs of said full wave bridge by the first and second outputs of said transistor, a switching regulator electrically connected between the first and second nodes of said power supply, said switching regulator having an output electrically interconnected with the input of said transistor, in order that said resistor has a voltage thereacross, said voltage thereacross being said second signal representative of said current flowing through said conductor; and wherein said switching regulator is adapted to switch said transistor on and off with a duty cycle of about 90%, in order that said voltage across said resistor substantially represents said current flowing through said conductor.

* * * * *